UNITED STATES PATENT OFFICE 2,377,048

COMPOSITION FOR USE IN WELDING

George W. Smith, Dayton, Ohio

No Drawing. Application July 27, 1942,
Serial No. 452,503

5 Claims. (Cl. 148—23)

This invention relates to a composition for use in welding, more particularly in electric welding, and the present application is a continuation in part of my application Serial No. 361,383, filed October 16, 1940.

As is well known, in electric welding two metallic bodies are welded one to the other by means of an electric arc maintained between a metal rod, or electrode, and the edges of the two parts being welded at the point where they are to be jointed. The arc melts both the electrode and the edges of the parts being welded and the two parts are thereby welded into one piece by the fusion of the electrode metal with the metal of the parts being welded. However, any impurities in the metal of the parts being welded or in the electrode or the coating thereon, where a coated electrode is used, will remain in the fused metal of the weld and tend to weaken the weld. Further, there is usually a more or less violent agitation of the molten metal in the seam which tends to produce porosity in the weld and thus weaken the same.

Due to the agitation of the molten metal and to explosions therein, resulting from air or other foreign matter in the molten metal, substantial portions of the molten metal will be ejected from the seam and will spatter over the adjacent surfaces of the parts being welded. This spatter adheres tightly to the metal surfaces so that it is very difficult to remove the same and it frequently pits or otherwise roughens those surfaces. It has been proposed heretofore to coat the metal surfaces adjacent to the seam with a composition which will prevent the adhesion of the weld spatter to the surfaces but such compositions, for the most part at least, comprise a chemical base of such a character that the contact of the weld spatter therewith produces smoke and odor which are highly objectionable and not conducive to healthful working conditions. It is very difficult to wholly remove such a composition from the metal surfaces so as to leave the latter clean and dry for subsequent finishing operations, such as a paint finish. Further, such compositions are non-conductors of electricity and if the composition enters the seam which is to be welded it tends to retard the penetration of the welding arc and is apt to break the arc. When the arc is broken and then re-established it is difficult to effect a perfect continuation of the weld which will be free from defects and possible leaks at the point where the break occurred. If any considerable quantity of such a composition enters the seam it will cause additional eruptions or explosions in the molten metal, thereby producing blow holes and porosity which tends to further weaken the weld. In multi-pass welding, where two or more successive welds are laid on top of each other it is necessary to apply such compositions before each weld in order to keep the spatter from sticking to the metal surfaces. This is difficult to do because of the heated condition of the welded parts, resulting from the first welding operation, and the repeated applications of the composition are objectionable because of the large amount of smoke and odor which result therefrom.

One object of this invention is to provide a composition which, when introduced into the seam, will fuse with the molten metal during the welding operation and will bring to the surface all impurities and oxides in the metal, thereby preventing porosity and blow holes in the weld, increasing the tensile strength of the weld and producing a relatively smooth uniform and flat weld.

A further object of the invention is to provide a composition having high electrical conductivity, which will prevent the welding arc from breaking during the welding operation and permit the deeper penetration of the weld.

A further object of the invention is to provide a composition which will stabilize the welding arc, that is, keep it in the center of the desired path.

A further object of the invention is to provide a composition which will improve the arcing characteristics of the welding electrode or rod and quiet the molten metal to such an extent as to materially reduce the amount of molten metal that is ejected from the seam and spatters over the surfaces of the parts being welded, and thus retain in the joint being welded a large part of the molten metal which would otherwise be wasted as spatter, and saving a part of the welding rod.

A further object of the invention is to provide such a composition which will form slag or powder on the completed weld and protect it from the oxidizing effect of the atmosphere which would tend to crack or weaken the weld.

A further object of the invention is to provide a composition which will effectively prevent the adhesion of the weld spatter to the metal surfaces, which will not produce smoke or odor, and which can be easily wiped off the metal surfaces and will not leave streaks or stains thereon.

A further object of the invention is to provide a composition which does not require application before each successive weld in multi-pass welding and which will retain its spatter-proofing effectiveness for several welding passes.

Other objects of the invention may appear as the composition is described in detail.

My composition is fluid in form and comprises a non-combustible liquid, which is preferably a conductor of electricity, and in which are suspended finely divided solids which have the properties of fusing in the molten metal in the seam, of separating impurities from the molten metal and causing the same to rise to the top of the weld, of preventing the adhesion of the spatter to metal surfaces adjacent to the seam, and of imparting high electrical conductivity to the composition. The preferred constituents of the composition are magnesium silicate, lime, (CaO), such as hydrated lime, and graphite, which are finely comminuted, intimately mixed and suspended in water. Both the magnesium silicate and the lime, particularly chemical hydrated lime, will fuse at welding temperatures and separate oxides and impurities and bring the same to the surface of the molten metal. They are both heat resistant and will not adhere tightly to the metal surfaces and are good conductors of electricity. Either magnesium silicate or the hydrated lime may be used without the other but I have found that greatly superior results are accomplished by using both, as each has properties not present in the other.

The proportions of the ingredients may vary but it is preferable that the quantity of magnesium silicate, by weight, should substantially exceed the quantity of lime, that the quantity of lime should substantially exceed the quantity of graphite and that the solids should be mixed with sufficient liquid to produce a fluid composition. In practice excellent results are achieved with a composition in which the ingredients are in the following proportions: sixty pounds of magnesium silicate, twenty pounds of chemical hydrated lime and one and one-half pounds of graphite, mixed with eighteen gallons of water. The magnesium silicate, lime and graphite in powder form are intimately mixed and combined in the water and, with approximately the aforesaid proportions, have little tendency to separate and will remain in suspension for substantial periods of time. The combining of the solids in the water may be accomplished in any suitable manner and satisfactory results are attained by forcing the initial solution through a series of screens of successively increasing fineness. While the proportions of the ingredients may be varied they are readily combined in the proportions named and the resulting composition is well adapted for use in welding operations employing either high or low welding amperage. However, the composition so formed may be thinned and increased in quantity by the addition of more water, and for economical reasons this may be desirable in low amperage welding.

The composition may be introduced into the seam and applied to adjacent surfaces or parts to be welded in any suitable manner, as by brushing or spraying, and the welding operation may be effected either before or after the composition has dried, but preferably while the composition in the seam is moist. During the welding operations the combined magnesium silicate, lime and graphite fuse with the molten metal and cause the oxides and impurities to rise to the surface of the weld, from which they may be easily wiped off. The fused magnesium silicate, lime and graphite after removing the impurities come to the surface of the weld and form thereon a powder or slag which protects the weld from the harmful oxidizing effect of the atmosphere, which would tend to crack or weaken the weld. The lime and magnesium silicate act as a "quieter" by preventing or materially reducing the agitation or boiling of the fused metal, and thus prevent the forming of air bubbles, which would produce a defective or porous weld, and greatly reduce the amount of spatter. The magnesium silicate particularly has a quieting effect on the molten metal and forms thereon a soft layer which covers the molten metal and excludes therefrom air currents caused by the electric arc and which cause explosions and spatter, and tends to retain the molten metal in the seam, and materially reduces the spatter.

The water serves not only as a liquid vehicle for the finely comminuted solids but reacts with the solids to effect other functions, more particularly in imparting a high degree of conductivity to the composition. When mixed with the chemical hydrated lime the water reacts therewith to form calcium hydroxide which is an excellent conductor of electricity when suspended in water. The magnesium silicate and graphite are also good conductors of electricity when suspended in water. Consequently the composition has high electrical conductivity and this conductivity permits a deep penetration of the welding arc, thereby producing a stronger and more uniform weld, and also tends to prevent the arc from breaking during the welding operation and to stabilize the arc.

The magnesium silicate, lime and graphite are all heat resistant and do not adhere to the metal surfaces and when the composition is applied to the surfaces adjacent the seam it forms thereon an effective protective coating which prevents the weld spatter contacting with and adhering to those surfaces. The coating and spatter can be easily removed by wiping the surfaces with a cloth or the like, this wiping leaving the surfaces clean and free from pits and stains.

The graphite is a preferred but not essential ingredient of the composition, as it materially increases the conductivity of the composition, and due to its lubricating qualities, adds materially to the non-adhesive properties thereof.

The composition will penetrate those portions of the metal which are adjacent the weld and are highly heated but are not fused, and a part thereof will be retained in the metal. This is of particular importance in multi-pass welding as a sufficient amount of the composition will remain in the metal after the first welding pass to produce the desired effects during the following passes.

All the ingredients being non-combustible no smoke or odor is produced by the electric arc or by the contact of the spatter with the composition on the metal surfaces. Not only can the composition be readily removed from the metal surfaces without leaving streaks, stains or pits, but the lime acts as a cleanser for the surfaces and the removal of the composition leaves the surfaces absolutely clean and ready to receive paint or other finishing treatment.

In addition to the ingredients above described the composition may include other ingredients for special purposes. For example, it is customary to coat welding rods with different compositions to better adapt the same to different kinds of steel, and the essential ingredients of these coatings may be added to the present composition and the same results secured without introducing into the weld the impurities usually found in rod coatings.

While I have described the preferred constituents of my composition and the preferred proportions thereof it is to be understood that I do not wish to be limited to the details thereof as various modifications and equivalents within the scope of the appended claims may occur to a person skilled in the art.

Having now fully described my invention, what I claim as new and desire to secure by Letters Patent, is:

1. A composition for use in welding comprising as its major solid constitutents lime and a relatively small amount of graphite intimately mixed with and suspended in a quantity of water sufficient to form a fluid composition.

2. A composition for use in welding comprising as its major solid constituents magnesium silicate, lime and a relatively small amount of graphite intimately mixed with and suspended in a quantity of water sufficient to form a fluid composition.

3. A composition for use in electric welding comprising as its major solid constituents finely comminuted hydrated lime and a relatively small amount of graphite mixed with and suspended in water to form a composition sufficiently fluid to be spread in a thin film on the surfaces of the parts to be welded.

4. A composition for use in electric welding comprising as its major solid constituents finely comminuted magnesium silicate and a relatively small amount of graphite mixed with and suspended in water to form a composition sufficiently fluid to be spread in a thin film on the surface of a part to be welded.

5. A composition for use in electric welding comprising as its major solid constituents magnesium silicate and hydrated lime, and including a relatively small quantity of graphite, all finely comminuted and mixed with and suspended in water to form a composition sufficiently fluid to be introduced in a seam to be welded.

GEORGE W. SMITH.